July 21, 1964

H. M. SWINDLER 3,141,283

APPARATUS FOR CUTTING VEGETATION

Filed Sept. 18, 1961

INVENTOR
Harry M. Swindler.
BY Jacobi & Davidson
ATTORNEYS

INVENTOR
Harry M. Swindler.
By Jacobi & Davidson
ATTORNEYS

United States Patent Office 3,141,283
Patented July 21, 1964

3,141,283
APPARATUS FOR CUTTING VEGETATION
Harry M. Swindler, Rockbridge County, Va.
(Rte. 1, Lexington, Va.)
Filed Sept. 18, 1961, Ser. No. 138,841
4 Claims. (Cl. 56—25.4)

This invention relates to improvements in apparatus for cutting vegetation, and more particularly to mowers of the type adapted to be pushed over a surface so as to cut the vegetation growing thereon to a predetermined height above the surface level.

Various types of mowers adapted to cut surface vegetation, or as commonly known, "lawnmowers," have heretofore been suggested. Generally, the lawnmowers may be divided into two types, namely, the reel-type and the rotary type. Reel-type mowers basically comprise a frame having ground engaging wheels disposed at opposite ends thereof, an elongate generally drum shape blade structure supported within the frame and rotatable about a horizontal axis with the ground engaging wheels, and a handle extending upwardly from the frame whereby a user can push the assembly over a surface to be mowed. The rotary-type mower, on the other hand, basically comprises a frame structure supported on ground engaging wheels, a blade element or elements mounted for rotation about a vertical axis, means to drive the blade element or elements, and a handle extending upwardly from the frame whereby the user can push the mower over a surface. The present invention is particularly concerned with rotary-type mowers, and thus it should be understood from the outset that the term "rotary-type" refers to the latter type of basic structure referred to in detail above.

While rotary-type mowers are known to possess certain advantages over reel-type mowers, prior assemblies of both types, to the best of my knowledge, are subject to causing ridges or streaks in the cut surface. Moreover, the available prior constructions adapted to cut area of any substantial width do not readily permit cutting a curved path, cutting around obstacles, or cutting and trimming of vegetation immediately adjacent walls, shrubs, or other obstructions.

Accordingly, one of the primary objects of the present invention is to provide an improved mower of the rotary type, which mower is not subject to the aforesaid disadvantages. More specifically, a primary object of the present invention is to provide a rotary-type mower adapted to be moved over a surface having vegetation growing thereon so as to cut the vegetation without ridges and streaks therein regardless of the surface contour and irregularities therein.

Still a further primary object of the present invention is to provide a mower conforming with the preceding objects, which mower is readily adapted to cut and trim close to walls, shrubs, or other obstructions, and which mower is readily adapted to cut in a curved path and around any obstacles which face the user while pushing the mower along a given path.

Additional, still further, yet more specific objects of the present invention are: (a) to provide in a mower of the rotary-type, the improvement which comprises locating all of the ground engaging wheels of the mower within and immediately to the rear of the rotational path of the cutting blade; (b) to provide in such a mower the further improvement of means permitting continuous adjustment of the vertical disposition of the ground engaging wheels between maximum and minimum limits whereby to allow for presetting of cutting height continuously between such limits; (c) to provide an improved mower of the rotary-type having a swivelly mounted ground engaging front wheel means, and a cutting assembly adapted to rotate about such wheel means; (d) to provide such a mower assembly wherein the sole support for the assembly for movement over the surface to be cut comprises the ground engaging wheels, all of which wheels are disposed within an area under the mower defined by the periphery of the rotary path of the cutting element and tangents thereto extending rearwardly thereof in a direction at least substantially parallel to the longitudinal axis of the handle or perpendicular to the rotational axis of the rear wheels; (e) to provide such a mower assembly incorporating a wheel support depending from the frame thereof for swivelly mounting the front ground engaging wheel means, and a blade support structure mounted for rotation about the wheel support and having a lower portion extending in surrounding spaced relation to the front wheel and carrying laterally projecting cutting blades thereon; (f) to provide such a mower assembly wherein the blade support structure is adapted to be driven by a belt and wherein the power means of the assembly incorporates a belt drive cooperating with the blade support structure; (g) to provide such a mower assembly wherein the power means is mounted on the frame means for movement with respect thereto, and adjustment means are incorporated to permit continuous adjustment of the power means position so as to effect adjustment of tension on the belt drive; (h) to provide such a mower assembly further including a detachable blade enclosing hood adapted to guard the cutting element and collect and direct cuttings outwardly thereof; (i) to provide such a mower assembly wherein the cutting blades thereof are detachably coupled with the blade structure so as to permit ready removal for sharpening and/or ready replacement if necessary; and (j) to provide such a mower assembly which can be easily and inexpensively manufactured and which, in addition, is trouble-free with continued operation.

Although the preferred embodiment of the invention comprises a mower of the rotary-type conforming with each of the above stated general and specific objects, auxiliary objects of the instant invention include the provision of certain improvements in mower construction regardless of the specific arrangement of basic components therein. More specifically, important auxiliary objects of the present invention are: (a) to provide in a lawnmower the improvement which comprises detachably coupling a blade enclosing housing having a forwardly opening arcuate outlet chute section to the mower assembly proper so as to achieve efficient mulching and readily permit removal of the housing for cleaning or the like; (b) to provide in a mower assembly having a belt driven cutting element, the improvement which comprises mounting a pulley drive power unit within the assembly so as to be movable with respect to the cutting element, and providing means to allow continuous adjustment of the power unit position whereby to adjust drive belt tension; and (c) to provide in a lawnmower assembly means for adjusting the vertical height of the cut, which means take the form of screw adjustment components.

The invention lies in the combination, construction, arrangement, and disposition of the various components and means incorporated in a mower assembly constructed in accordance herewith. The invention will be better understood, and objects other than those specifically set forth above will become apparent when consideration is given to the following detailed description. Such description refers to the annexed drawings, presenting the preferred and illustrative embodiments of the invention, and wherein:

FIGURE 4 is a partially elevational and partially sectional fragmental view of the preferred mounting arrangement for the rear ground engaging wheels of the assembly, the sectional portion of FIGURE 4 being taken on the line 4—4 of FIGURE 1.

Figure 1:
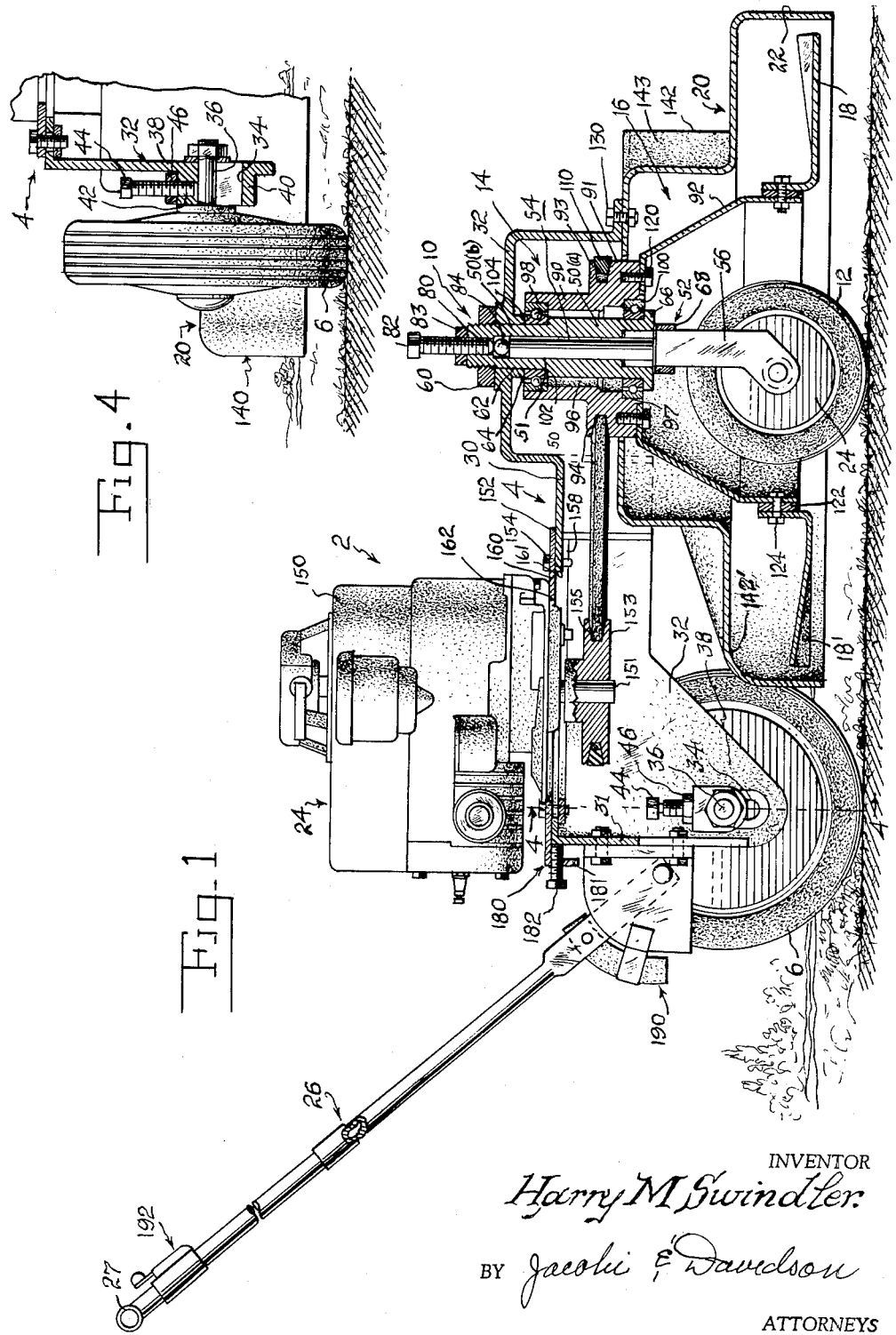
FIGURE 1 is a side view, partially in section, of a vegetation mower assembly constructed in accordance with the present invention, FIGURE 1 being taken on the line 1—1 of FIGURE 2.

In the figures, the overall mower assembly is generally designated by the numeral 2 and as shown, comprises a frame means 4, a pair of spaced apart rear ground engaging wheels 6 and 8, a forward wheel support generally designated by the numeral 10 having a front wheel 12 swivelly carried thereon, a blade support assembly generally designated by the numeral 14 having a lower portion 16 extending in surrounding spaced relation to the front wheel 12 and carrying laterally projecting cutting blades 18 and 18′ thereon, a blade enclosing hood 20 depending from the frame means 4 and having a skirt portion 22 surrounding the lower portion of the blade structure, and power means generally designated by the numeral 24 and carried on the frame means. A handle generally designated by the numeral 26 projects rearwardly of and upwardly and outwardly from the frame means 4 so that the whole assembly can be conveniently pushed by an operator over a surface having vegetation thereon to be cut.

The frame means 4 comprises an elongate upper section 30 having a pair of leg bracket sections 32 depending therefrom at the rear end thereof. As best shown in FIGURES 1 and 4, the bracket sections 32 have a vertical shaft receiving slot 34 therein and each of the rear wheels is mounted on a wheel shaft 36 extending through, and slidable within, the receiving slot 34. The bracket section 32 preferably is formed by providing the frame means with a plate-like depending arm 38 having a slot therein, and affixed thereto a collar 40 projecting laterally outward of the plate-like arm 38 and also having a slot therein aligned with the slot in arm 38. The outwardly projecting collar 40 has a threaded bore 42 disposed vertically therein, and this bore is adapted to receive a threaded lug 44 whereby the height of the slot 34 can be adjusted by rotation of the lug 44 so as to move the base end thereof within the slot 34. By virtue of this construction, the vertical height of the wheel shaft 36 can be readily adjusted continuously, and as explained in more detail below, the cutting height can be preset. A lock nut such as that designated by numeral 46 can be provided with the lug 44 to permit maintaining of the lug in any preset position.

While the wheel 6 and its associated bracket structure have been presented in detail in FIGURE 4, it should be understood that a duplicate of such assembly is provided on the opposite side of the frame means for mounting of wheel 8. The particular form which wheels 6 and 8 take, and the manner in which they are rotated on the wheel shafts 36 form no part of the instant invention. Any suitable wheels can be used as well as any suitable arrangement for mounting the wheels for rotation about the wheel shafts.

The forward portion of the frame means 4 or more particularly the upper section 30 thereof includes a centrally disposed housing section 32. Supported by and extending within this housing section is the wheel support 10 which, as explained more fully below, rotatably carries the blade support assembly 14.

The wheel support 10 comprises a hollow shaft member 50 fixedly secured at its upper end to housing 32, and a wheel bracket 52 comprising an upper shaft portion 54 rotatably received in the shaft member 50, and a lower bracket portion 56 having the front wheel 12 fixed thereto. The shaft member 50 comprises a lower portion 50a and an upper portion 50b of reduced diameter over the lower portion. The upper portion 50b is threaded at the upper end thereof and adapted to receive a lock nut 60 which bears against a flange 62 forming the upper terminal end of the housing 32 and surrounding the opening 64 provided in the housing for receiving the upper end of portion 50b of the shaft member 50.

The lower portion 50a of the shaft member 50 terminates in an outwardly projecting flange 66 and the lower bracket portion 56 of the wheel bracket 10 carries a collar 68 abutting against the flange 66 whereby a bearing face is formed between the lower end of flange 66 and the upper end of collar 68.

Figure 3:
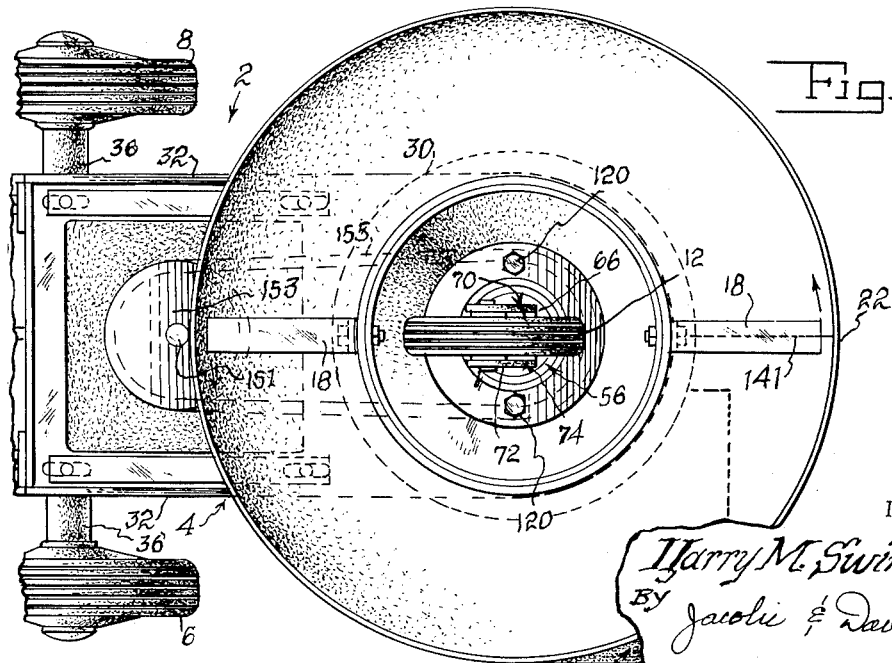
FIGURE 3 is a bottom plan view of the mower shown in FIGURE 1.

The bracket portion 56 is bifurcated, as best shown in FIGURE 3, so as to provide spaced arms 70 and 72 between which the wheel 12 is rotatably mounted on shaft 74. As should be apparent, the cooperation between the wheel bracket 52 and the hollow shaft member 50, serves to swivelly mount the wheel 12 in the forward portion of the assembly.

In order to permit vertical adjustment of the wheel 12, the shaft member 50 has a threaded bore 80 in the upper end thereof and an adjustment lug 82 carries threads cooperating with those of bore 80 so that the lug 82 is continuously vertically adjustable. A ball 84 is disposed within the primary bore 51 of the shaft member 50 above the top end of the upper shaft portion 54 of the wheel bracket 10. When it is desired to vertically adjust the position of the wheel 12, the lug 82 is rotated so that the lower end thereof moves, for example, downwardly as shown. As this adjustment of the lug takes place, the ball 84 is pushed according to this example, downwardly, and as a result the upper shaft portion 54 and lower bracket portion 56 are also pushed downwardly. Of course, after the lug 82 has been adjusted downwardly from the position shown in FIGURE 1, if it were desired to vertically raise the wheel 12, then the lug 82 would be rotated for upward movement. Preferably, the completed assembly includes a lock nut such as that designated by numeral 83 so that the lug 80 can be maintained in a preset position.

In addition to providing a support and swivel mounting of the wheel 12, the wheel support serves as a means on which to mount the blade support assembly 14. The blade support assembly comprises an upper pulley drive section 90 preferably having a depending drum-like skirt 92 attached thereto. The pulley drive section 90 is in effect a spool-like collar having a central bore 96 recessed at opposite ends thereof to receive ball bearings 98 and 100. As shown, the ball bearing 98 is fixed between the ledge 102 defining the intersection of portions 50a and 50b of the shaft member 50 and the flange collar 104 provided on the inside of the housing 32 in surrounding relation to the opening 64 therein. The ball bearing 100, on the other hand, is fixed between the upper face of flange 66 and within the recess 97 at the lower end of bore 96.

The pulley drive section 90, when mounted as explained above, is freely rotatable on the bearings 98 and 100 about the shaft member 50. As shown, the drive section includes an enlarged lower portion 91 provided with a V-groove 93 therein to receive a drive belt 110 extending from the power means 24.

The skirt 92 is detachably fixed to the pulley drive section 90 of the blade support assembly by means of bolts 120, and accordingly is rotatable with the pulley drive section thereof. The skirt 92 is preferably formed with a generally frusto-conical upper portion and a cylindrical lower portion. The lower portion is surrounded by a reinforcing ring 122, and the blade elements 18 and 18′ are attached to the skirt 92 by means of the bolts 124. As many blade elements as desired may be attached to the skirt 92, and by virtue of the bolt coupling, the blade elements can be readily removed for sharpening, repair, or replacement, as needed.

Figure 2:
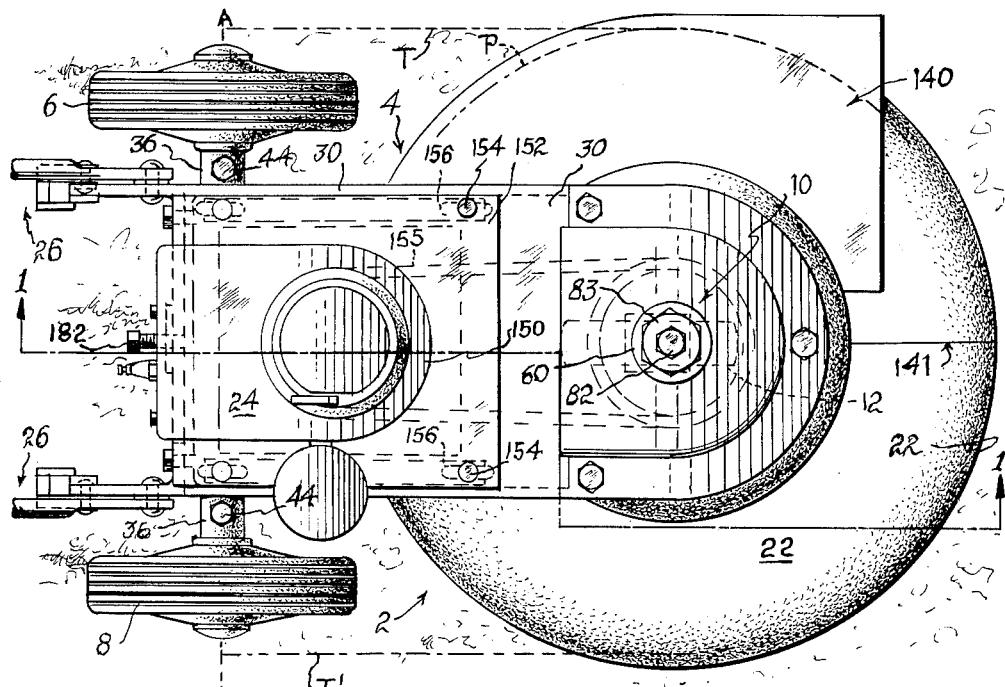
FIGURE 2 is a top plan view of the mower shown in FIGURE 1.

The blade enclosing housing 20 is detachably coupled with the frame means 4 by the bolts 130. This housing not only surrounds the lower portion 16 of the blade assembly, so as to guard the same, but in addition serves to collect and direct cutting forwardly outwardly of the housing. For this purpose, the housing is provided with an arcuate chute section 140 extending around the periphery of the rear half of the housing 20 and then extending forwardly as shown in FIGURE 2. The chute section 140, as shown in FIGURE 1, tapers upwardly from its closed end 141 (FIGURE 3) and terminates at the forwardly directed opening 142. The provision of the chute provides for automatic discharge of cuttings from within the housing, and by providing a detachable coupling between the frame means and the housing, the housing can be readily detached for purposes of cleaning or the like.

As will be noted by again referring to FIGURE 1, the housing 20 comprises an enlarged lower portion 23, and a reduced coupling or cap portion 25. The chute section 140 extends from the lower portion so as to terminate at the discharge opening 142 which is vertically positioned above the lower portion. The terminal end section 143 of the chute section 142 extends generally parallel to the lower portion 23. This construction has been found to not only provide for satisfactory discharge, but also to provide for efficient mulching, because the discharged cuttings again encounter the rotating blade elements.

As suggested above, the blade support assembly 14 is driven by the power means 24. The power means as shown comprises a gas engine, however, it should be understood that the power means can comprise any suitable motor whether of the two cycle or four cycle gas-type, or of the electric-type. The important aspect of the invention in this regard is that some motor means is provided for driving the blade support assembly, and accordingly the cutting elements thereof. The motor shown in FIGURE 1 is designated by the numeral 150 and is mounted on a support plate 152 overlying the upper surface of section 30 of the frame means 4. The plate 152 is provided with suitable apertures to permit the passage therethrough of bolts 154, and the section 30 of the frame means is provided with elongate slots 156 through which bolts 154 pass. The bolts are fixed in position by means of a suitably tapped base ring 158 which can be tightened against the underside of the section 30 of the frame means 4. Section 30 is, as shown, constructed with an opening 160 therein aligned with the opening 162 in the support plate 152 and adapted to receive the projecting components of the motor 150.

The motor 150 has a drive shaft 151 extending therefrom below the underside of the section 30, and this shaft carries a drive pulley 153. The drive belt 110 cooperates with the V-groove 155 in pulley 153 and the V-groove 93 in the pulley drive section 90 of the blade support structure whereby, when the motor is operated, it serves through the pulley 153, and belt 110, to drive the blade assembly.

By providing the slots 156 in the frame means 4 as well as the bolts 154 and clamping ring 158, the support plate 152 is slidable axially along the frame means 4 if the bolts 154 are loosened. To provide for continuous adjustment of the position of the support plate 52, and accordingly of the motor 150, a right angle bracket 180 is fixed to the support plate 152 by welding or other suitable means, or formed integrally with the support plate, and a screw lug 182 is threaded through the depending leg 181 of the bracket 180 whereby the inner end thereof engages the depending flange 31 extending from the section 30 of frame means 4. It should be apparent that by rotating the lug 182 so that it moves inwardly, for example, the motor 150 is moved to the left as shown in FIGURE 1, and the pulley 153 carried on the shaft thereof is also moved to the left. As the pulley 153 moves to the left, the tension on the drive belt 110 increases. Conversely, as the lug 182 is moved outwardly, the tension on the drive belt 110 is decreased. Thus, the screw lug 182 and associated bracket, and cooperation therebetween with the frame means, permits adjustment of the tension on the drive belt 110 continuously. Once the tension is suitably adjusted, the bolts 154 are tightened so as to clamp the ring 158 against the frame means, and also clamp the support plate 152 in position.

The handle 26 is coupled to the frame means 4 by conventional brackets such as those generally designated by the numeral 190 and as is also conventional, the handle 26 preferably carries a control adjustment such as that designated by numeral 192 adjacent the cross bar 27 disposed at the upper end of the handle. The control adjustment, in the mower shown in FIGURE 1, is essentially a throttle lever adapted to govern the speed of the motor, and/or control the choke thereof. However, it will be readily apparent that the control adjustment can serve any purpose depending on the particular type of power unit employed.

In the overall mower assembly provided hereby, and as a most important aspect of the invention, the wheels 6, 8 and 12, which serve as the sole means for supporting the mower for movement over a surface to be cut, are disposed in a particular manner. More specifically, as suggested hereinabove, all of the ground engaging wheels are located within an area under the mower, which area has its periphery defined by the periphery of the path of the cutting element and tangents thereto extending rearwardly thereof at least substantially perpendicular to the rotational axis of the rear ground engaging wheels.

For a better understanding of the disposition of the ground engaging wheels in a mower constructed in accordance herewith, consider FIGURE 2 wherein the outer periphery of the path traversed by the cutting blades 18 and 18' is shown in phantom and designated by the letter P. Tangents to the path P which extend rearwardly thereof are shown in phantom and designated by the letters T and T', respectively. The tangents T and T' extend perpendicular to the rotational axis of the rear ground engaging wheels 6 and 8, which axis is also shown in phantom and designated by the letter A.

The front ground engaging wheel 12, is disposed within the periphery of the cutting path by virtue of its being supported centrally of the blade support assembly. The rear wheels 6 and 8 are disposed between the tangents T and T' because, in accordance with the invention, the bracket sections 32 are disposed to support the rear ground engaging wheels in such position.

With all of the ground engaging wheels supported as aforesaid, the height of the cut depends solely on the contour of the cutting path, and is independent of any depressions or other surface irregularities which may exist ahead of, or alongside the cutting path. Thus, the invention provides a mower which is not subject to producing ridges or streaks in the cutting of vegetation.

Moreover, with the central disposition of the ground engaging front wheel of the assembly, there are no projections to the side of the overall assembly, aside from the guard skirt 22, and the mower is adapted to cut close to walls or the like. Additionally, as suggested above, the provision of a swivel mounted front wheel readily permits cutting a curved path and facilitates cutting around obstacles in the mowing path.

After reading the foregoing detailed description of the illustrative and preferred embodiments of the invention, it should be apparent that the objects set forth at the outset of this specification have been successfully achieved. It should also be apparent that various modifications can be made to the overall assembly provided hereby, as well as the component parts incorporated therein, without departing from the scope and spirit of the invention. Accordingly, what is claimed is:

1. In a vegetation mower, the combination of frame means, a pair of spaced apart rear ground engaging wheels fixed to and projecting below said frame means to support the rear portion of the mower, a wheel support projecting below said frame means forward of said rear wheels comprising a hollow shaft member fixedly secured to said frame means, front ground engaging wheel means mounted on said wheel support, a blade support assembly mounted for rotation about said wheel support assembly, said blade support assembly having a lower portion extending in surrounding spaced relation to said front wheel means and carrying laterally projecting cutting blades thereon, said blade support assembly further comprising an upper pulley drive section and a lower depending skirt portion, said upper pulley drive section being supported on bearings for rotation about said hollow shaft member, a blade enclosing housing detachably coupled to said frame, said housing having an arcuate outlet chute therein disposed to collect and direct cuttings from the rear of said housing forward of said mower, power means carried on said frame means and cooperating with said assembly to drivingly rotate said assembly, said power means including a pulley belt drive cooperating with said pulley drive section, and a motor means mounted on the topside of said frame means and having a drive shaft extending to the underside thereof, a pulley carried on said drive shaft, said pulley belt drive extending cooperatively between said pulley and said pulley drive section, means for continuously adjusting the vertical position of each of said ground engaging wheels between maximum and minimum projecting positions whereby to permit continuous adjustment of cutting height, a wheel bracket comprising an upper shaft portion rotatably received in said shaft member and a lower bracket portion having said front ground engaging wheel means fixed thereto, screw adjustment means carried by said shaft member and disposed to adjustably limit the vertical level of the top of said shaft position, support plate means for mounting said motor for limited sliding movement along said frame means, and screw adjustment means for permitting continuous adjustment of said support plate means whereby to adjust tension on said pulley belt drive.

2. In a vegetation mower, the combination of frame means, a pair of spaced apart rear ground engaging wheels fixed to and projecting below said frame means to support the rear portion of the mower, a wheel support projecting below said frame means forward of said rear wheels, front ground engaging wheel means mounted on said wheel support, a blade support assembly mounted for rotation about said wheel support, said blade support assembly having a lower portion extending in surrounding spaced relation to said front wheel and carrying laterally projecting cutting blades thereon, a blade enclosing housing detachably coupled to said frame, said housing having an arcuate outlet chute therein disposed to collect and direct cuttings from the rear of said housing forward of said mower, power means carried on said frame means and cooperating with said assembly to drivingly rotate said assembly; support plate means for mounting said power means for limited sliding movement along said frame means, longitudinally extending screw adjustment means for permitting continuous adjustment of said support plate means, and means for continuously adjusting the vertical position of each of said ground engaging wheels between maximum and minimum projecting positions whereby to permit continuous adjustment of cutting height.

3. The combination defined in claim 2, wherein said wheel support comprises a hollow shaft member fixedly secured to said frame, a wheel bracket comprising an upper shaft portion rotatably received in said shaft member and a lower bracket portion having said front ground engaging wheel means fixed thereto, and adjustment means carried by said shaft member and disposed to adjustably limit the vertical level of the top of said shaft position.

4. The combination defined in claim 3, wherein said blade support assembly comprises an upper pulley drive section and a lower depending skirt portion, said upper pulley drive section being supported on bearing for rotation about said hollow shaft member, wherein said power means includes a pulley belt drive cooperating with said pulley drive section and wherein said power means comprises motor means mounted on the topside of said frame means and having a drive shaft extending to the underside thereof, a pulley carried on said drive shaft, and a belt extending cooperatively between said pulley and said pulley drive section.

References Cited in the file of this patent

UNITED STATES PATENTS

| | | |
|---|---|---|
| 2,287,126 | Packwood | June 23, 1942 |
| 2,509,936 | Packwood | May 30, 1950 |
| 2,530,684 | Davis | Nov. 21, 1950 |
| 2,545,074 | Dielschneider | Mar. 3, 1951 |
| 2,669,826 | Watrous | Feb. 23, 1954 |
| 2,825,196 | Gudmundsen | Mar. 4, 1958 |
| 2,860,474 | Cyr | Nov. 18, 1958 |
| 2,865,159 | Musgrave | Dec. 23, 1958 |
| 2,948,544 | Rowe et al. | Aug. 9, 1960 |
| 2,983,096 | Phelps | May 9, 1961 |